United States Patent [19]

McCullough

[11] 4,169,300

[45] Oct. 2, 1979

[54] SPRING-BIASED, INSTANTLY UNLOADED KNIVES FOR PENETRATING AND TENDERIZING MEAT, AND HYDRAULICALLY CONTROLLED STRIPPING MEANS

[76] Inventor: Timothy J. McCullough, West Lake, Vermilion, Ohio 44089

[21] Appl. No.: 854,375

[22] Filed: Nov. 23, 1977

Related U.S. Application Data

[63] Continuation of Ser. No. 677,796, Apr. 16, 1977, abandoned.

[51] Int. Cl.² .............................................. A22C 9/00
[52] U.S. Cl. ...................................................... 17/25
[58] Field of Search ............................... 17/25; 279/22

[56] References Cited

U.S. PATENT DOCUMENTS

| 2,838,266 | 6/1958 | Rees | 279/22 UX |
| 3,535,734 | 10/1970 | Ross | 17/25 |
| 3,744,089 | 7/1973 | Fetzer et al. | 17/25 |
| 3,991,439 | 11/1976 | Wagner | 17/25 |

Primary Examiner—Willie G. Abercrombie

[57] ABSTRACT

For tenderizing meat, an apparatus is described which drives a multiplicity of tenderizing knives into the meat. The knives are carried by a reciprocable ram head with a predetermined stroke. A stripper plate associated with the ram head follows the latter during its downward stroke, and presses against the meat to strip it from the knives buried in it when the knives are withdrawn. A hydraulic circuit controls the required reciprocation of the stripper plate. The knives are mounted in pairs on a shaft which is spring-biased in such a way that an impact of the knives against an obstacle instantly removes the bias exerted by the spring. Meat to be tenderized may be placed intermittently under the stripper plate either manually or utilizing a conveyor belt.

6 Claims, 9 Drawing Figures

SPRING-BIASED, INSTANTLY UNLOADED KNIVES FOR PENETRATING AND TENDERIZING MEAT, AND HYDRAULICALLY CONTROLLED STRIPPING MEANS

This is a continuation of application Ser. No. 677,796 filed Apr. 16, 1977 now abandoned.

BACKGROUND OF THE INVENTION

That a significant fraction of the meat butchered in the United States, not to mention the world, is tenderized by one method or the other, prior to being sold, is no longer even a poorly kept secret. Today, throughout the world, meat is routinely tenderized prior to being placed on the shelves for purchase by the consumer. By far the most desirable means for tenderizing meat is by natural aging but this process is too expensive except for the most choice cuts. For average quality meat, less expensive methods are favored, such as the use of various chemicals, vegetable enzymes and the like, the effectiveness of which appears to be correlatable with the amount used, with a predictable effect on the taste of the end product. Presently most favored are tenderizing machines which perform the tenderizing function by cutting sinews and fibers of the meat. This cutting is usually effected by arrow-shaped knife edges on a long slender knife shaft. When it can be reasonably assumed that the meat will be free of knife edge-damaging material, then the meat may be tenderized with the knives rigidly mounted. However, when there is reason to expect that pieces of bone, gristle and the like may be included in the meat to be tenderized, it is provident to mount the knives in such a manner that they are less likely to be broken or damaged by tough masses within the meat which masses have the effect of retarding the movement of the knives.

A representative meat tenderizer utilizing rigidly mounted knife blades is disclosed in U.S. Pat. No. 3,744,089 to Fred Fetzer, et al, which also teaches a stripper carriage constructed to move in coordination with a ram carriage. Locking pawls carried by the stripper carriage are locked relative to the frame of the machine before the ram starts to withdraw the tenderizing knives out of the meat. When the knives are withdrawn from the meat, the locking pawls are released and then the stripper carriage moves upwardly with the ram carriage. The locking pawls and related mechanism is a mechanical locking means for controlling the operation of the stripper.

It should be noted that Fetzer et al teaches using a conveyor belt which is driven to produce a predetermined amount of movement; and this conveyor movement and timing means which causes the conveyor belt to move only when the knives are clear of the meat, may be satisfactorily used with my apparatus. Conveyor means, other than of the type which provides incremental advance may also be used. For example, a conveyor having a continuous movement so that meat pieces travelling thereon can be knifed thereon, is taught in U.S. Pat. No. 3,719,504 to Joseph Greenspan et al, and may also be adapted for use with my invention. In any event, the particular manner of presenting the meat to be tenderized beneath the knives of my invention is a matter of choice and may be manual or mechanical, utilizing any known means to serve the purpose. A further description of means for presenting the meat beneath the knives is unnecessary as it forms no part of the present invention.

A meat tenderizer, utilizing a constant fluid-pressure to cushion a multiplicity of tenderizing knives is disclosed in U.S. Pat. No. 3,535,734 to Henry M. Ross. After dwelling on the problems of tenderizing meat, there is presented a carefully detailed analysis of the problems associated with the use of spring-biased knives. Ross also states that the piercing action of spring-biased spikes or knives "tends either to alter the shape of the meat in much the fashion of cube steak hammers . . . , or to be ineffective in breaking down the tough fiber structure." This latter problem is not evident in my invention in which slender knives are preferably used.

It is further stated in Ross that "A spring rate system, which is not a force limiting system, cannot result in a practical answer." Accordingly, the Ross patent provides a reciprocable fluid reservoir which exerts a constant fluid pressure selected to be less than one-half of the force required to damage a knife, providing a safety factor in excess of 2. When this force is exceeded the shank of the knife is pushed back into the pressure head, against the force exerted by the fluid. Since the force exerted by the fluid is constant, there is no total release. As the reservoir is raised enough to withdraw the knives from the meat, the constant fluid pressure in the reservoir forces the retracted shank out of the reservoir. Like Ross, U.S. Pat. No. 3,381,603 discloses a fluid pressurized force yieldable needle.

The use of a spring-biased system is unequivocally abjured because the problems of mechanical meat tenderizing "can be solved practically only by a true force-limiting system and not by a spring-biased (spring rate) system which is, in fact, an increasing-force system, since, in a spring rate system, the force will increase as the blade is forced to retract as a natural consequence of Hooke's Law". Yet, it is a spring-biased system which is used in my invention in a unique and surprisingly effective embodiment to be described hereinafter.

SUMMARY OF THE INVENTION

It is a general object of this invention to provide a mechanical means for tenderizing meat by making a multiplicity of small deep cuts in the meat without regard to whether or not there are tough, knife-damaging occulsions of bones, gristle or cartilage within the meat, or at the surface thereof.

It is also a general object of this invention to provide a reciprocable ram in which a multiplicity of individual spring-biased mainshafts, from which knife-carrying shafts depend, are disposed in such a manner that they are held sufficiently strongly to penetrate a mass of meat to be tenderized, or, they are not held at all, so that there is no resistance to a shaft after it encounters an obstruction, and is released.

It is another general object of this invention to provide an apparatus for tenderizing meat in which the tenderizing knives may be optionally locked non-releasably into position.

It is a further general object of this invention to provide a release mechanism, in the form of a module, for a cylindrical shaft which provides a predetermined spring-biased force longitudinally against one end of such shaft, so that when the other end of the shaft encounters a force in excess of the predetermined spring-biased force, the spring-biased force against the one end of the shaft is essentially instantly unloaded or released so that the one end of the shaft has no longitudinal force exerted against it.

It is a specific object of this invention to provide a reciprocable ram in which a multiplicity of spring-biased release mechanisms or modules are disposed so as to exert a pre-determined cutting force upon each of a multiplicity of meat-tenderizing knives in such a manner that if any of the knives encounters a hard obstacle likely to damage the knife, the encounter will cause the spring-biased pressure against that knife to be instantly released thus avoiding damage to that knife.

It is also a general object of this invention to provide a hydraulic circuit to control the operation of a stripper such as is conventionally used in known meat-tenderizing apparatus, which, because of the hydraulic circuit, obviates problems normally encountered because of wear on mechanical systems, such as locking pawls, and the like.

It is a specific object of this invention to provide a dual acting hydraulic cylinder which operates in unison with the stripper mechanism in such a way that it is hydraulically locked in position when the stripper plate rests against the meat to be tenderized, and continues to be locked in position until the knives are withdrawn from the meat.

BRIEF DESCRIPTION OF THE DRAWINGS

The foregoing and other objects and advantages of a meat tenderizer of my invention will appear more fully from the following description made in connection with the accompanying drawings, of preferred embodiments of the invention, wherein like reference characters refer to the same or similar parts throughout the several views and in which.

DETAILED DESCRIPTION OF A PREFERRED EMBODIMENT OF THE INVENTION

Figure 1:
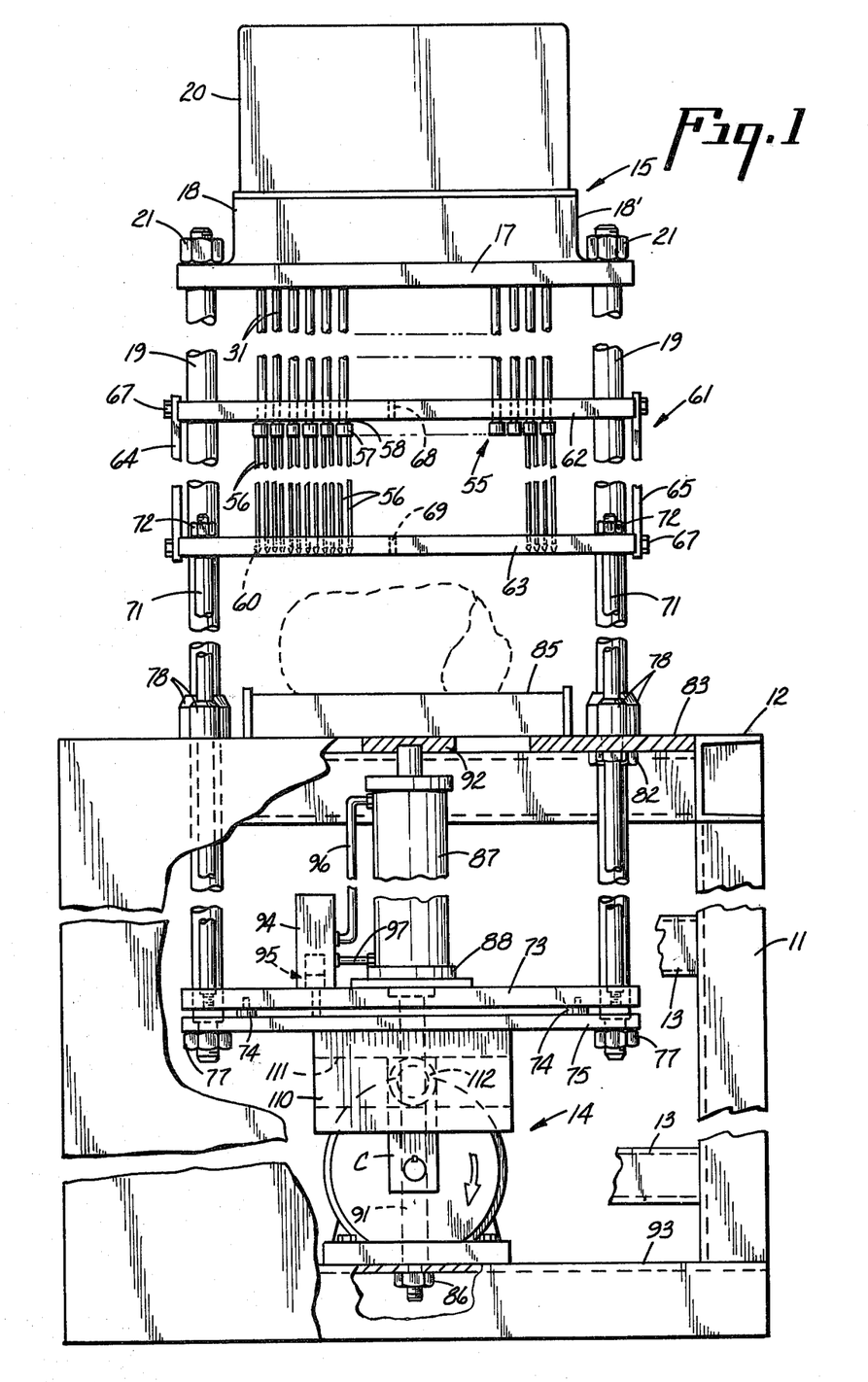
FIG. 1 is a front elevational view of the meat tenderizer with parts broken away, diagrammatically illustrating a meat tenderizer embodying the invention.

Referring to FIG. 1 there is shown portions of the main frame of the machine which comprises corner posts 11, parallel top side frame members 12, intermediate side members 13, and sufficient other side and end members (not shown) to provide a rigid framework within which a drive means, indicated generally by reference numeral 14, is housed, and which supports the tenderizer apparatus.

The drive means 14 is drivingly engaged with a ram, indicated generally by reference numeral 15, and optionally, with a conveyor means (not shown) for carrying meat to, and away from, the tenderizer's knives. The drive means 14 may include any conventional means such as an electric motor, which, through conventional suitable power reduction gearing, is drivingly connected to a crank arm C chosen to provide a reciprocating motion of predetermined stroke for the ram 15, in a manner well known to those skilled in the art, and need not be described in any further detail.

The ram 15 is a generally slab-like heavy member 17, made of suitable metal, which for operation, is mounted horizontally near the top of a pair of parallel vertical, oppositely disposed ram tie rods 19, and secured thereto with nuts 21. As will be seen by reference to FIGS. 3 and 4, the heavy member 17 is preferably rectangular and provided with a vertical peripheral wall in which provides rigidity and strength to the heavy member 17, and forms an enclosure which surrounds the working mechanism of the ram. In particular, oppositely disposed end walls 18 and 18' serve to anchor means to hold down the working mechanism of the ram as will be explained hereinafter. Flanged end portions 23 are provided on heavy member 17 and passages 24 are provided in the flanged end portions, through which passages the ram tie rods 19 are inserted. A cover 20 cooperates with the vertical walls of the heavy member 17 to keep the working mechanism clean.

Figure 4:
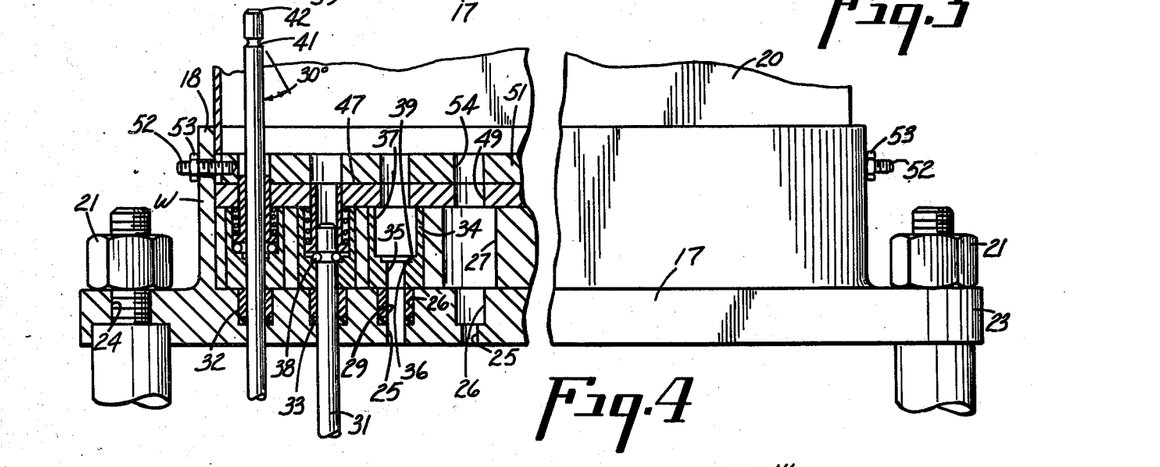
FIG. 4 is an elevational view partially in cross section and with portions broken away in which is diagrammatically illustrated a ram which may be selectively used either to provide a rigid mounting for the mainshafts, or, to provide release, that is, be unloaded when a pre-determined force is exceeded; and, which diagrammatically illustrates (a) a module of the spring release mechanism in which a mainshaft has been released, (b) a module in which a mainshaft is held in the meat-tenderizing position, and (c) a cavity within the ram in which cavity a module may be removably inserted.

The slab-like member 17 is provided with means for mounting a multiplicity of modular spring-biased release units, indicated generally by reference numeral 30, as will be described hereinafter. Since it is convenient to manufacture each release unit in cylindrical shape, the member 17 is provided with a multiplicity of cylindrical cavities in which the release units are disposed, one in each cavity. Each cavity is formed by providing the member 17 with plural, stepped, first, second and third vertically aligned bores 25, 26, and 27 respectively. The bore 25 slidably accomodates a mainshaft 31 which carries a pair of knives as will be explained hereinafter. The bore 26 snugly accomodates a bushing 32, having an axial bore 29 to slidably accomodate mainshaft 31, and an O-ring sealing means 33 which sealingly engages the circumference of the main shaft 31. The O-ring and bushing may be made of any suitable elastomer, preferably a synthetic resin such as nylon, silicone, or the like, to prevent corrosion by cleaning and loss of lubricants used in the ram. The bore 27 snugly accomodates a cylindrical housing 34 which in turn is provided with plural, stepped, first, second and third vertically aligned bores 35, 36 and 37 respectively which are coaxial with bores 25, 26 and 27. The bores 29 and 35 are substantially of the same diameter. The bore 36 is larger than bore 35 and of sufficient diameter to accomodate plural balls 38 on shoulder 39 which balls are so placed about a mainshaft 31 in bore 36, as to be upwardly and outwardly displaceable from the bore 36 in response to an upward displacement of the mainshaft 31. To this end, the inside circumference of the shoulder 39 is chamfered sufficiently to allow the balls 38 to "climb out" of the bore 36 responsive to a very small upward displacement of the mainshaft, and it will be presently evident that for quick release it will be desirable to have the depth of the bore 36 as small as is practical.

Referring further to FIG. 4 it is seen that mainshaft 31 is provided near its upper end with an annular groove 41 which serves a dual purpose; it effectively transmits any upward displacement of the shaft 31 to the balls 38 placed contiguous to the shaft, and the groove prevents the mainshaft 31 from being withdrawn downwardly through the bore 35. The top of the mainshaft 31 is bevelled at 42 to permit insertion of the shaft from below, that is, through bore 25, by displacing the balls 38 upwards and outwards.

Figure 5:
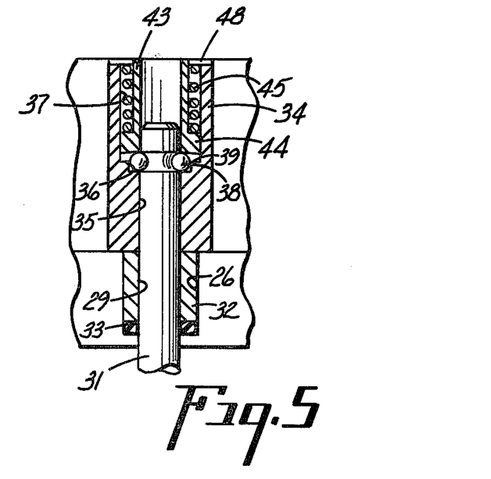
FIG. 5 is an elevational cross sectional fragmental view, enlarged, of a preferred embodiment of a modular release mechanism diagrammatically illustrating in greater detail than in FIG. 4, particular structural features which permit its effective operation.

As will be seen by reference to FIG. 5, the bore 37 slidably accomodates a sleeve 43 having a radial flange 44 at its lower end. The sleeve 43 has a diameter which slidably accomodates the mainshaft 31. The lower surface of the flange 44 rests on the balls 38 and the upper surface supports a helical compression spring 45 which is disposed about the sleeve 43 in the annular space between the cylindrical housing 34 and the sleeve 43. The spring 45 is chosen to exert a predetermined force against the flange 44, the balls 38 and the shaft 31. This force is exerted by placing a spring backup plate 47, as illustrated in FIG. 4, over the sleeve 43 which is slidably disposed in a vertical bore 49 provided in the spring backup plate 47. It will be understood that the bore 49 is precisely machined so as to be in registry with each of the sleeves 43 of each module or spring release unit. By a "spring release unit" or "module", I specifically refer to the cylindrical housing 34, the balls 38, the sleeve 43 and the spring 45. The backup plate 47 thus biases each spring 45 in the same manner, and, as each spring 45 is essentially identical with every other spring 45, each mainshaft 31 is held with the same force. It is preferred to provide a washer sealing means such as a stainless steel washer 48 (see FIG. 5) between the cylindrical housing 34 and the backup plate 47 so that the washer cushions the spring and slidably fits around the sleeve 43. As seen in the "held" position in FIG. 4, that is, when the mainshaft is biased by the spring due to its action on the balls held in the annular groove, the upper surface of the backup plate 47 is essentially coplanar with or slightly above the upper end of the sleeve 43 for the sole purpose of providing an option as to how the ram is to be operated. More particularly the ram may be operated with knives rigidly mounted, as it could be when the meat to be tenderized is essentially free of knife retarding obstructions, or not.

To provide this option, a slide plate 51 may be used. The slide plate 51 is essentially a duplicate of backup plate 47 and is provided with bores 54 of substantially the same diameter as bores 49 and in registry therewith, to obtain release of the mainshaft when release is desired. When the bores 49 and 54 are aligned, an upward displacement of the balls 38 into the bore 37 will cause an upward displacement of the sleeve 43 into the bore 54 and the mainshaft is essentially instantaneously released.

When no release is desired, the slide plate 51 is displaced horizontally with respect to plate 47 so that the lower surface of slide plate 51 interferes with and prevents upward displacement of the sleeve 43. This displacement may be effected by a threaded stud 52 inserted in plate 51 in cooperation with a lock nut 53. The stud 52 slidably protrudes from the side of the vertical wall 18 of slab-like member 17. Preferably several studs 52 are used on oppositely disposed vertical end walls 18 and 18', so that the studs not only serve the function of sliding the slide plate back and forth, but also serve to hold down the slide plate 51 against the thrust of the compression springs 45.

Figure 3:
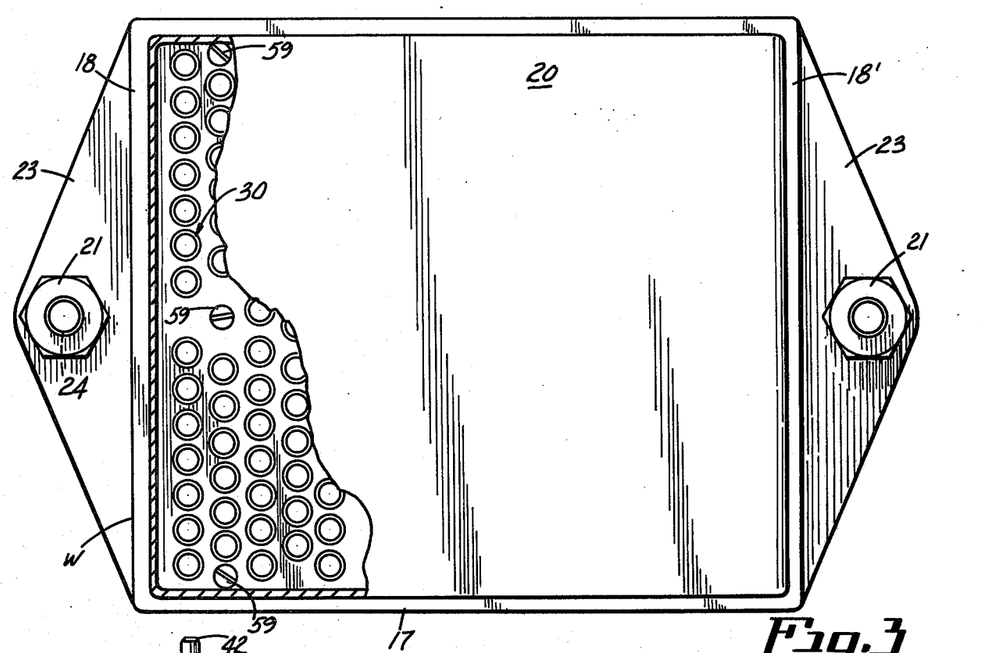
FIG. 3 is a plan view of the ram diagrammatically illustrating the placement of a multiplicity of spring release mechanisms in which mainshafts for carrying the tenderizing knives are downwardly spring-biased.

As is seen in FIG. 3, a multiplicity of modules 30 are inserted in the heavy member 17. The pattern in which they are disposed is a matter of choice, a rectangular format being convenient. In the illustration, 246 modules are set on approximately 0.687 inch centers. Each module carries a mainshaft 31 which is held within the sleeve 43 by means of the balls 38 held in the bore 36. The mainshaft is conveniently inserted in the module by pushing the beveled top 42 of the mainshaft upwardly through the elastomer bushing 32, dropping the balls 38 around the main shaft through the top of the heavy member 17, sliding the sleeve 43 over the mainshaft 31 with flange 44 downwards so it rest against the balls, and sliding the spring 45 over the sleeve 43. The backup plate 47 is then held down on the heavy member 17 with machine screws 59, compressing the spring 45. The mainshaft 31 is then pulled down into place with the balls 38 held in the annular groove 41.

For better operation, the mainshaft is provided with a slight angle in the range from about 10° to about 45°, and preferably about 30°, on the lower edge of the annular groove 41, to facilitate entry of the balls 38 into the annular groove 41. Also, the inner edge of the shoulder 39 is broken, and preferably provided with a slight radius, to facilitate displacement of the balls 38 out of the bore 36 and into the bore 37.

As illustrated in FIG. 1, each mainshaft 31 is provided at the lower end thereof, with mounting means, indicated generally by reference numeral 55, for mounting only one or a plurality of knife shafts 56 each of which is provided near its lower extremity with a cutting edge or sharp point. The knife shafts may be welded to the mainshaft as disclosed in U.S. Pat. No. 3,842,464. More preferably the knife shanks are press-fitted into a socket mounting means 55 which comprises a cylindrical knife shaft mount 57 and a reduced cylindrical upper portion or mainshaft mount 58. The cylindrical knife shaft mount 57 is preferably of sufficient diameter to accomodate at least two knife shafts in parallel, vertical, side-by-side relationship, and the mainshaft mount 58 is of sufficient diameter to provide a bore in which the lower extremity of the mainshaft is frictionally tightly mounted. The socket means 55 is preferably formed of a synthetic resinous material such as nylon, high density polyethylene, polypropylene or the like, and suitable bores are provided in the socket 55 so as to tightly, frictionally, secure the shafts 31 and 56 as illustrated.

Each knife shaft 56 carries at its lower extremity a sharp knife 60 which may be of any desired configuration. Suitable configurations are taught in U.S. Pat. No. 3,744,089; and 3,842,464 inter alia. Instead of a knife with a blade, a sharp needle may be used. Like a blade, the needle punctures the meat and severs tough tissue, thus tenderizing it. The design of the cutting instrumentality is arbitrary and forms no part of this invention, it being acknowledged that variously shaped meat cutting instrumentalities have been utilized since man's cave-dwelling era. For the purpose of this invention the term "knife", and related terms, are used to describe, generically, any cutting instrumentality for cutting or piercing meat.

Referring further to FIG. 1, there is illustrated a stripper carriage, indicated generally by reference numeral 61, which includes a pair of parallel horizontal plates, namely a return plate 62 and a stripper plate 63, these plates being secured at each side in predetermined spaced apart relationship by spacer means, namely spacer plates 64 and 65. The spacer plates are preferably bolted to the return and stripper plates with fastening means such as hexagonal bolts 67, to provide a rigid carriage. The return plate 62 comprises a rectangular perforated member which is preferably made of aluminum, stainless steel, or a rigid synthetic resinous material such as polypropylene, having a multiplicity of through perforations 68, each of which is positioned directly below one of the mainshafts 31, so that when the mainshafts are lowered through the return plate 62, they are accomodated, each one by a perforation 68. The perforations are preferably only slightly larger than the mainshafts 31 as they guide the mainshafts and prevent the shafts from being bent.

The stripper plate 63 comprises a rectangular perforated member of suitable material, having a multiplicity of through perforations 69 each of which is positioned directly below one of the knife-shafts 56, so that when the knife-shafts are lowered through the stripper plate 63, they are accomodated, each one by a perforation 69. The perforations 69 are shown larger than the knife shafts' diameter, as each perforation must accomodate a knife blade which may be relatively wide and flat compared to the diameter of the knife shaft.

Figure 2:
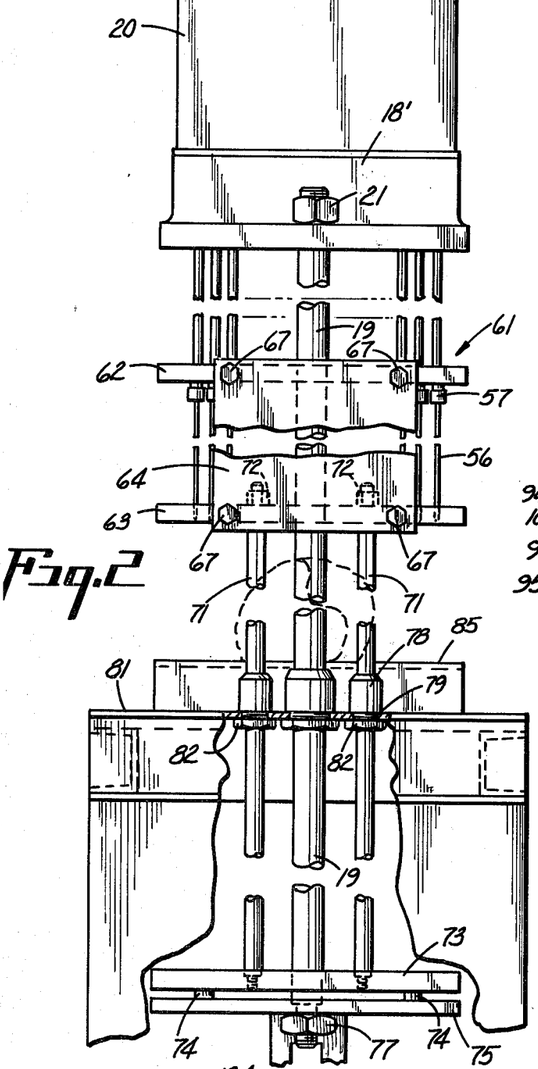
FIG. 2 is a side elevational view of the meat tenderizer assembly, with parts broken away, illustrating major structural features.

As seen more clearly in the end-view illustrated in FIG. 2 the stripper plate 63 is supported on each of two sides by a pair of stripper plate tie rods 7 and fastened thereto by nuts 72 threadably disposed on the upper ends of the tie rods 71. The lower ends of the tie rods 71 are secured to a stripper platen 73. The stripper platen 73 comprises a rectangular member which forms a base on which the four stripper tie rods 71 and the stripper carriage 61 are supported. The lower surface of the stripper platen 73 is provided with bumper means or feet 74 to cushion the stripper platen as it comes into contact with a power platen 75 directly below the stripper platen.

The power platen 75 supports a pair of parallel, vertical, oppositely disposed ram tie rods 19 which are secured thereto, for example by nuts 77 threadedly disposed on the lower ends of the ram tie rods. The upper end of each of the ram tie rods is inserted through passages 24 in the heavy member 17 and secured thereto, for example by nuts 21.

It will be appreciated that the tie-rods 71 and 19 are relatively long members, and may extend from 3 feet to about 6 feet or more in length, depending upon the stroke of the ram. Thus it is provident to provide bushing means 78 in horizontal members 81 and 83 in the supporting framework through which the tie rods are guided. A reduced portion 79 of the bushing means, which reduced portion extends below the horizontal members 81 and 83, is threaded to accomodate a nut 82, as is conventional.

The horizontal members 81 and 83 provide coplanar surfaces on which an anvil 85 is horizontally supported. A chunk of meat to be tenderized is placed on the anvil directly beneath the knives 60 and the upper surface of the anvil is preferably no closer to the knives 60, than the stroke of the ram when the ram is in it's topmost position.

It will be evident from the simplified description of the apparatus hereinabove that the stripper platen 73 rests on the power platen 75 except when there is a piece of meat which interferes with and prevents the downward motion of the stripper as it follows the ram on the downward stroke of the ram.

In the operation of tenderizing a piece of meat, the function of the stripper and the ram will now be described for two separate situations, one in which there is essentially no knife-retarding obstructions in the meat, and one in which there is such an obstruction. In addition, an unusual third situation where the obstruction is essentially near the surface of the piece of meat, will also be described.

Where the piece of meat is placed beneath the stripper plate and there is essentially on obstruction in the meat, the start of the cycle initiates downward motion of the ram and forces the knives into the meat. The stripper carriage 61 follows the ram down, and then the stripper carriage comes to rest because the stripper plate 63 is supported by the piece of meat. If there is no obstruction, the knives are inserted into the meat and driven therethrough until the downward stroke of the ram is completed. Upon completion of the downward stroke, the ram moves upward while the stripper plate is locked against the meat using any conventional locking means. As the ram continues its upward motion the knives are removed from the meat, the plate 63 is unlocked, and is free to follow the ram upwards. At no time is there a contacting of the top of the spacer plate 65 by the bottom of the heavy member 17 for the reason that the distance therebetween is chosen to be slightly greater than the stroke of the ram.

Where there is an obstruction which might damage a knife, such as a piece of bone within the meat, the ram head will move downwards until one or more knives is retarded by the obstruction. This causes an essentially instantaneous release of the mainshaft in the affected module, while the remaining knives continue their downward motion. As before, the stripper carriage including the return plate 62 and stripper plate 63 follow the downward motion of the ram until the lower surface of the stripper plate 63 rests against the meat. The stripper plate is locked in this position while the ram continues downward to complete its downward movement. Upon the ram commencing it's upward movement the obstructed knife is still frictionally held within the meat at the point where it was obstructed. It remains in this position until the ram is raised sufficiently to cause the upper surface of the mainshaft mount 58 to come into contact with the lower surface of the return plate 62, which with stripper plate 63, is locked in position against the piece of meat. As the ram continues upward, the upper end of mainshaft 31 will eventually be withdrawn into its module to return the main shaft into its loaded position.

Where the obstruction to a knife is met near the surface of the meat, and there is essentially no frictional holding of the knife blade in the meat, the stripper plate rests against the bone while the downward movement of the knives continues as before, and upon withdrawing the ram upwards, the released main shaft awaits arrival of the ram near its top most position at which point the main shaft is reset in its loaded position.

Figure 8:
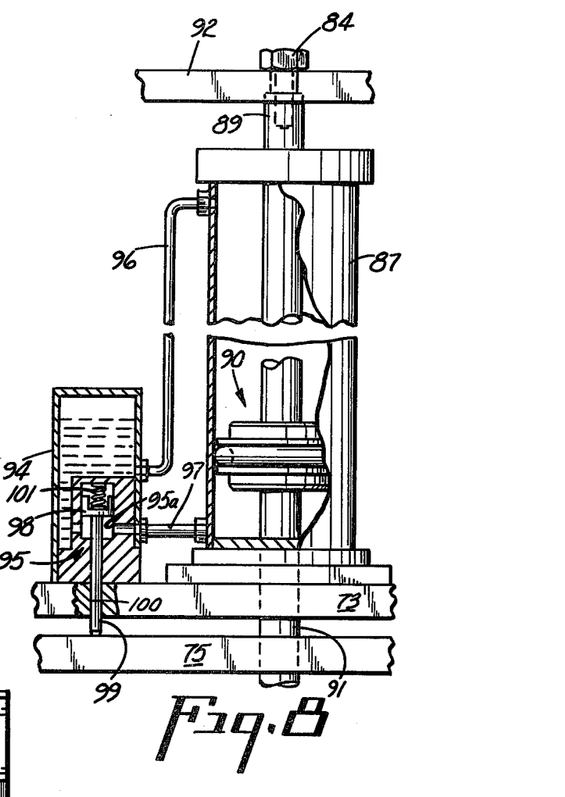
FIG. 8 is an elevational cross sectional fragmental view, enlarged, of the locking portion of the meat tenderizer, with parts broken away.

Though in the foregoing description it is assumed that any conventional mechanical locking means may be used to secure the desired action of the stripper carriage, it will be seen that, in FIG. 1 there is illustrated a hydraulic cylinder 87 which is fixedly mounted vertically in a base 88 secured to the stripper platen 73, and which hydraulic cylinder effectively provides the desirable locking and unlocking action for the stripper carriage. This action will be more readily understood by reference to FIG. 8 which diagrammatically illustrates a double acting hydraulic cylinder 87 of the type commercially available, for example as a Miller Model J cylinder. A piston rod 89 extends vertically, axially through the upper end of the cylinder 87 and another piston rod 91 extends axially downwardly through the lower end of the cylinder 87. The upper end of the piston rod 89 is secured to the structural framework, for example with a nut 84 to a horizontal frame member 92, and the lower end of the piston rod 91 is fastened with a nut 86 to a base member 93 of the machine framework. The hydraulic cylinder 87 is part of a hydraulic locking and unlocking circuit which includes a reservoir 94 for oil or other suitable fluid, and a valve means, indicated generally by reference numeral 95, which is in selectively opened and closed fluid communication with the reservoir 94 and cylinder 87. As illustrated in FIG. 8 an upper oil line 96 places the reservoir 94 in open fluid communication with the upper portion of the hydraulic cylinder, that is, with the chamber above piston 90 of the cylinder; and a lower line 97 places valve means 95 in communication with the lower portion of the hydraulic cylinder, that is, with the chamber below piston 90 of the cylinder. For convenience the valve means 95 is shown within reservoir 94. The valve means 95 comprises a cylindrical cavity 95a in which a cup-shaped piston 98 is slidably snugly fitted. A feeler rod 99 is attached to the bottom of the piston 98 and slidably protrudes axially through bore 100, extending through and below the stripper platen 73 to contact the upper surface of power platen 75. A spring means, such as a helical compression spring 101 rests in the cup-shaped piston with the upper surface of the spring biased against the upper surface of the cylindrical cavity. When the stripper platen 73 rests on the power platen 75, as shown, the feeler rod 99 and the cup-shaped piston 98 are displaced upwards so that the valve is open, and the oil reservoir 94 is in open fluid communication with both the upper and lower portions of the hydraulic cylinder 87. However, when downward motion of the stripper plate 63 is interfered with, as for example when a piece of meat is placed on the anvil and the stripper plate comes to rest on the meat, the downward motion of the stripper platen 73 is also stopped. The power platen 75 continues its downward motion and spring 101 biases the cup-shaped piston 98 downwards to seal off passage of oil, either into or out of the reservoir 94. When the valve 95 is closed, piston 90 is hydraulically locked in position.

Upon completion of the downward stroke of the power platen, and the subsequent progression of the upward stroke of the power platen, the knives 60 are withdrawn from the meat while the stripper plate 63 is locked in postion holding down the meat. Eventually, the upwardly moving power platen 75 encounters the feeler rod 99 and displaces it upwards. This causes valve 95 to open, unlocking the stripper plate 63. The feet 74 of the stripper platen 73 come to rest on the power platen 75 and the stripper plate 63 follows the ram to its topmost position.

It will be apparent to the skilled artisan that the precise disposition of the valve means is unimportant, as long as it effectively prevents loss of fluid from the lower portion of the hydraulic cylinder when the stripper plate 63 rests on a piece of meat. It is unnecessary to state that suitable provisions are made to ensure that fluid tight seals are used on the pistons 90 and 98, piston rods and feeler rod, and that the connections for lines for fluid flow are fluid tight. It will also now be apparent that the double acting hydraulic cylinder 87 is free of air and that the reservoir 94 serves to accumulate oil displaced from one side of the cylinder, and reintroduce the oil to the other side when the valve is open. When no meat is placed on the anvil, and the crank arm provides reciprocating motion to the power platen, the stripper carriage 61 simply rides up and down following the power platen upon which it rests.

As stated hereinbefore any suitable drive means may be employed to reciprocally translate the ram in a vertical direction so as to force the knives into the piece of meat to be tenderized. A typical crankshaft drive means conventionally used in disclosed in U.S. Pat. No. 3,719,504. A typical fluid-actuated cylinder for driving the ram is disclosed in U.S. Pat. No. 3,535,734. A preferred drive means is diagrammatically illustrated in FIG. 1 herein, and utilizes a guide block 110 which has a dual function. The guide block is provided with a horizontal slot 111 in which a bearing means 112 is slidably disposed. The bearing 112 is translated horizontally in the slot 111 and is reciprocally driven by crank-arm C to which it is operably connected. The guide block 110 is fixedly secured to the lower surface of the power platen 75 and provides the vertical reciprocal motion of the power platen. The guide block 110 is also provided with a vertical bore through which the lower piston rod 91 is slidably disposed so as to provide lateral support for the lower piston rod thus stabilizing the entire framework of the meat tenderizing apparatus.

Figure 6:
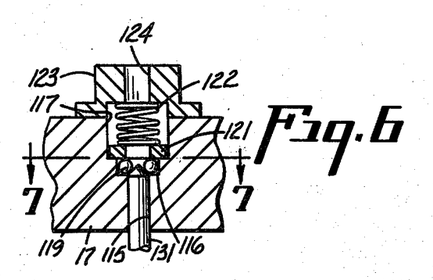
FIG. 6 is an elevational cross-sectional view of a simplified embodiment of a modular release mechanism.
Figure 7:
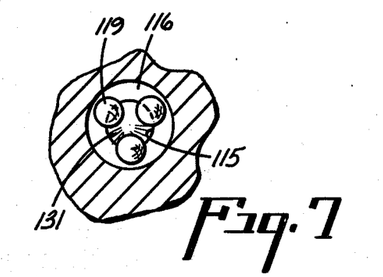
FIG. 7 is a cross sectional top view along the line 7—7 of the module illustrated in FIG. 6.

Referring now to FIG. 6 there is shown a cross section elevational view of a simplified form of the spring-biased instantaneously releasable shaft of this invention, wherein the heavy member 17 is provided with first, second and third coaxial stepped bores 115, 116 and 117 respectively. As before, the diameter of the third bore 117 is greater than that of the second bore 116; and, the diameter of the second bore 116 is greater than that of the first bore 115. Also as earlier stated, for ease of assembly the third bore may be provided in a separate plate member which is affixed to a lower member in which the first and second bores are provided, so that the third bore is in coaxial registry with the first and second bores. For the purposes herein, the term heavy member is used to describe a member in which the three bores are provided, whether the heavy member is a single member or not. A mainshaft 131 is slidably inserted in bore 115 and balls 119 are placed around the mainshaft 131 in bore 116. The number of balls used is not critical, but it will be apparent that plural balls, preferably three (as shown in FIG. 7) or more balls, will be most effective. The diameter of the balls 119 is chosen so that they are in lightly touching contact with the wall of the bore 116 and in contact with the top of the mainshaft 131. Since in this embodiment the only concern is with essentially instantaneous release of the mainshaft, and not whether it may be pulled downward through the bore 115, no annular groove is provided, as described in the embodiment illustrated in FIGS. 4 and 5 inter alia. Instead, the top of the mainshaft is generally conical, the angle being chosen to effect the requisite vertical displacement of the balls into bore 117, and also to permit a downward force component axially along the mainshaft 131. This force component is provided by a spring means 122 as will be explained hereinbelow. A preferred slope of the conical top of the mainshaft is about 30° from the vertical.

The depth of bore 116 is chosen to permit the balls to climb out of bore 116 when any upward force greater than a predetermined force is exerted by the mainshaft 131. A preferred depth of bore 116 is about one-half the diameter of a ball 119, and the top of the wall of the bore 116 is preferably chamfered to facilitate egress of the balls from bore 116.

A washer 121, having a through aperture for passage of the mainshaft 131, is placed in the bottom of bore 117 and rests on the balls 119. The washer 121 is vertically displaceable responsive to an upward displacement of the balls 119. Since locking the mainshaft 131 is of no concern, at it is in the embodiment described in FIG. 5, inter alia, the washer 121 provides an effective keeper means, keeping the balls in their desired coplanar configuration. The spring biasing means 122, preferably a helical coil spring having a preselected spring constant, is coaxially disposed in bore 117 and rests on washer 121. The inside diameter of the spring 122 is selected to loosely accomodate the mainshaft 131. The spring 122 is held in place by a cap 123 fastened to the heavy member 17 by fastening means (not shown). The cap 123 is provided with an axial bore 124 is registry with the mainshaft 131 so as to permit the mainshaft, when released, to slide through the bore.

In operation, the mainshaft is biased by the spring 122 with a preselected force. When an opposite force, sufficient to compress the spring 122 enough to allow the balls 119 to be displaced into bore 117, is transmitted by the mainshaft, the mainshaft is instantly released. When this occurs there is no force exerted downwardly on the mainshaft. It is preferred that the balls 119 be displaced with a slight compression of the spring generally less than 0.25 in., and more preferably less than 0.062 in.

Figure 9:
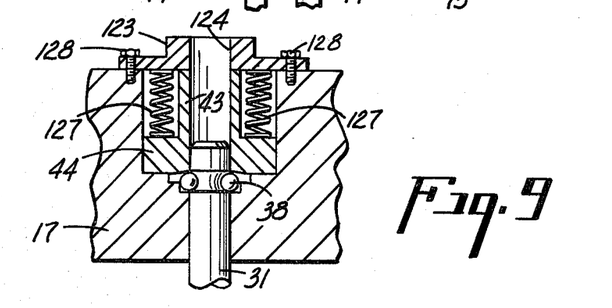
FIG. 9 is an elevational view of another embodiment of a spring release mechanism utilizing plural springs.

Those skilled in the art will recognize that the sensitivity of lighter springs is better than that of heavier springs, that is having large spring constants, and that the action of a spring is most reproducible during its initial compressive deformation, axially. Accordingly where a relatively great spring pressure is desired, sensitivity and reproducibility may be achieved by utilizing the embodiment illustrated in FIG. 9 wherein a mainshaft 31 is held in place by spring pressure exerted by plural identical helical coil springs 127 on the flange 44 of the sleeve 43. As described hereinbefore a cap 123 with an axial bore 124 is fastened to heavy member 17, for example with bolts 128. In this manner, with the springs 127 preferably symmetrically disposed about the flange 44, the spring-biased force exerted on the mainshaft 31 may be controlled with a greater degree of accuracy than with a single helical spring as described in other embodiments.

Modifications, changes and improvements to the preferred form of the invention herein disclosed, described and exemplified may occur to those skilled in the art who come to understand the principles and precepts thereof. Accordingly the scope of the patent to be issued herein should not be limited to the particular embodiments of the invention set forth herein, but rather should be limited by the advance of which the invention has promoted the art.

What is claimed is:

1. In a meat tenderizing apparatus having a frame, support means for supporting meat to be tenderized, a ram, means mounted on said frame operatively associated with said ram for guiding said ram for vertical reciprocation toward and away from said support means, a plurality of module means disposed in said ram each said module means carrying a downwardly directed meat tenderizing knife, means effective to reciprocate said ram to cut said meat, a stripper carriage operably disposed to move in coordination with said ram to strip said meat on the upward stroke of said ram, and means for locking said stripper carriage in relation to said reciprocable ram, the improvement wherein said module means comprises a housing having first, second and third stepped coaxial bores, said first bore slidably accomodating a shaft from which said knife depends, said second bore having displaceably disposed therein plural balls instantly responsive to upward displacement of said shaft, and said third bore having displaceably disposed therein keeper means supported on said balls said keeper means having a passage through which said shaft may be slidably longitudinally translated, and spring biasing means with preselected spring constant to bias said keeper means against said balls so that a knife-retarding obstruction in said meat which exerts an upward force sufficient to displace said balls into said third bore essentially instantaneously releases said shaft so that there is no downward force on said shaft after it is released.

2. In a meat tenderizer having a ram movable toward and away from a piece of meat to be tenderized, a spring-biased tenderizing knife to be carried by the ram for piercing a piece of meat, the improvement comprising mounting means for mounting said knife in said ram in which there is provided first, second and third stepped coaxial bores, said third bore having a larger diameter than said second bore which has a larger diameter than said first bore; a shaft slidably disposed in said first bore, said knife being operably attached to said shaft, plural balls held coplanarly in said second bore to exert a downward force against said shaft, said balls being displaceable from said second bore into said third bore responsive to an upward displacement of said shaft, said third bore having displaceably disposed therein a keeper means supported on said balls, said keeper means having a passage through which said shaft may be slidably translated, and coil spring means to exert a preselected force on said keeper means, so that an opposing axial force on said shaft greater than said preselected force will cause sufficient compression of said spring means to displace said balls from said second bore into said third bore, and to essentially instantaneously release said shaft and cause it to be translated through said passage.

3. The meat tenderizing apparatus of claim 1 wherein said shaft is provided with an annular groove near its upper end in which groove said plural balls are engaged to prevent downward displacement of said shaft through said first bore.

4. The meat tenderizing apparatus of claim 3 wherein said annular groove is provided near its lower edge with an inclined surface having a slope of about 60° from the horizontal to facilitate displacement of said balls by said shaft.

5. The meat tenderizing apparatus of claim 1 wherein the wall of said second bore is chamfered to facilitate displacement of said balls from said second bore into said third bore.

6. In a meat tenderizing apparatus having a frame, support means for supporting meat to be tenderized, a ram, means mounted on said frame operatively associated with said ram for guiding said ram for vertical reciprocation toward and away from said support means, a plurality of module means disposed in said ram each said module means carrying a downwardly directed meat tenderizing knife, means effective to reciprocate said ram to cut said meat, a stripper carriage operably disposed to move in coordination with said ram to strip said meat on the upward stroke of said ram, and means for locking said stripper carriage in relation to said reciprocable ram, the improvement wherein said module means comprises a housing having first, second and third stepped coaxial bores, said first bore slidably accomodating a shaft from which said knife depends, said second bore having displaceably disposed therein plural balls instantly responsive to upward displacement of said shaft, and said third bore having non-displaceably disposed therein keeper means supported on said balls, spring biasing means to bias said keeper means against said balls, and plate means operatively disposed on said ram to prevent displacement of said keeper means.

* * * * *